United States Patent Office 3,597,160
Patented Aug. 3, 1971

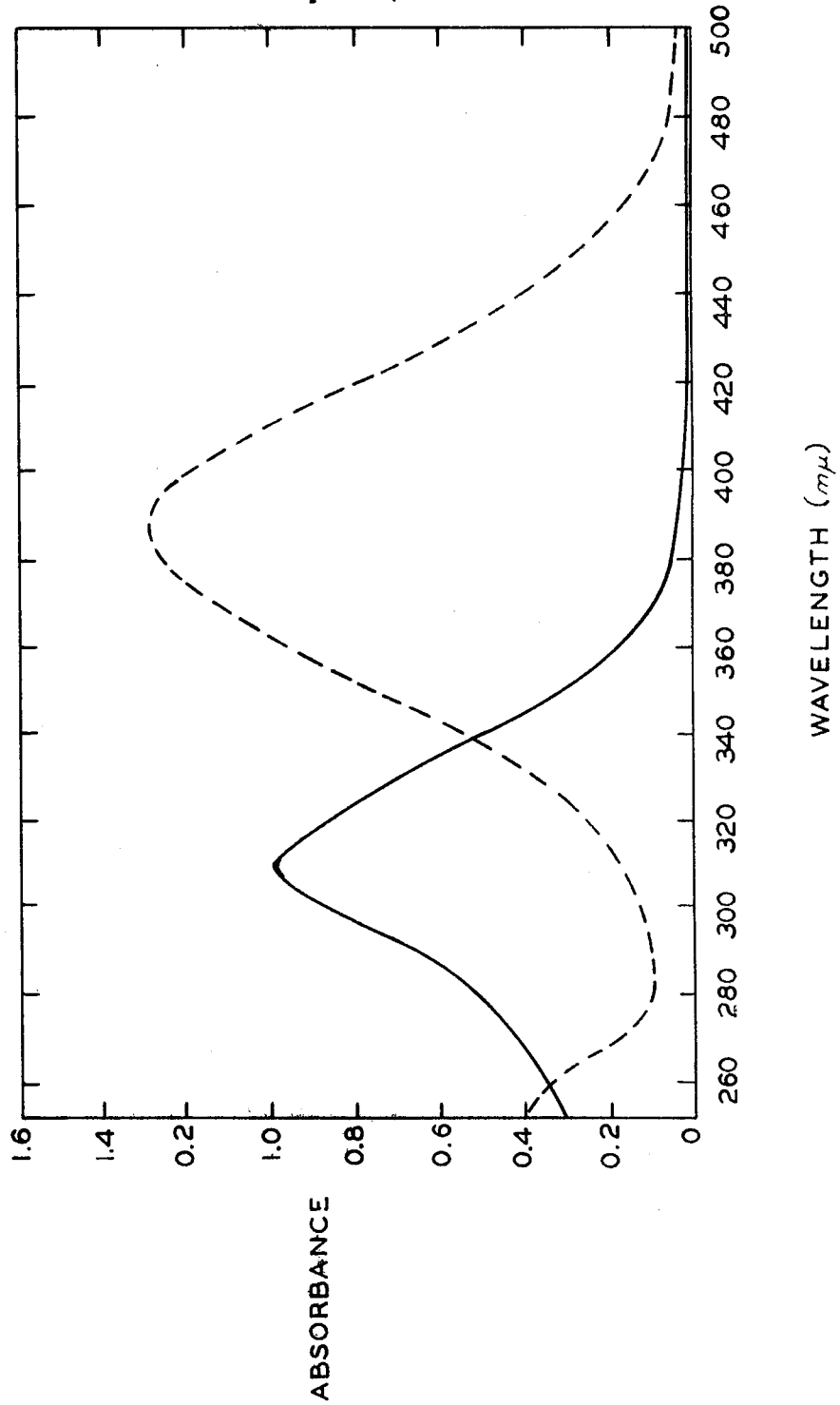

3,597,160
COLORIMETRIC METHOD FOR DETERMINING THIOLS
Davide R. Grassetti, Berkeley, Calif., assignor to Arequipa Foundation, San Francisco, Calif.
Filed Apr. 2, 1969, Ser. No. 812,839
Int. Cl. C07d 31/48; G01n 31/22
U.S. Cl. 23—230R
6 Claims

ABSTRACT OF THE DISCLOSURE

Method of analysis of principal utility in determining the presence of thiols in various samples by selective visualization in thin-layer or paper chromatography, or electrophoresis, but which also adapts itself, when working with organic solutions, to the use of spectrophotometographic or simple colorimetric devices. The process is one wherein the reagent chemical 2,2'-dithiobis-(5-nitropyridine) reacts rapidly and irreversibly with the thiol compound to form a thione derivative of the reagent chemical and a disulfide of the thiol compound. The resulting thione manifests a characterizing spectrum having absorption at useful wavelengths, from an analytical standpoint, in both the ultraviolet and the visual ranges.

---

The invention described herein was made in the course of, or under, a grant from the U.S. Public Health Service, Department of Health, Education and Welfare.

BACKGROUND OF THE INVENTION

A variety of chemicals is available for the analysis of thiols using the ultraviolet method of analysis. However, for the convenience of laboratory personnel, and in the interests of saving time, it would be desirable if a thiol determination method were available which instantly, by formation of a characteristic color, indicated the presence in the compound under analysis of sulfhydryl groups. It is a principal object of the present invention to supply such a method.

SUMMARY OF THE INVENTION

It has been discovered that analytical determinations of the sulfhydryl group content of thiols can be made using 2,2'-dithiobis-(5-nitropyridine) as the reagent compound for reaction with the sample compound. In the ensuing irreversible reaction, which takes place rapidly under ambient conditions, the reagent chemical is converted to the corresponding, yellow-colored thione product which is found to absorb in both the visible and the ultraviolet range.

The reaction which takes place between the reagent compound hereof and a thiol present in the sample under test can be illustrated by the following equation, wherein the 2,2'-dithiobis-5(nitropyridine) is shown reacting with cysteine to produce 5-nitro-2-thione-pyridine and cysteine:

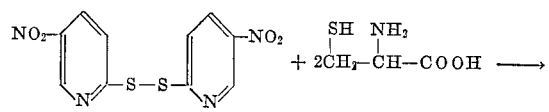

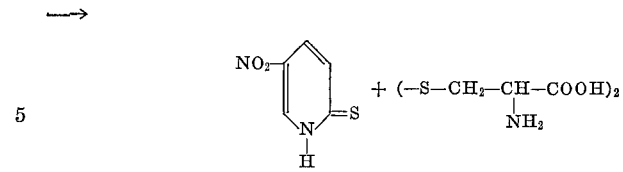

The method is suitable for the visual detection of even extremely small amounts of thiols and, as a practical matter, can be applied with particularly good effect to methods of thin-layer or paper chromatography, electrophoresis and, in general, any method wherein visual detection of thiols is desired. Thus, in one embodiment of the invention, a solution of the reagent chemical in an appropriate solvent, e.g., a 0.03% by weight solution of the reagent in acetone, is sprayed onto or otherwise applied to a porous surface such as filter paper to which has been applied an aqueous or other solution of a thiol compound. The spots or other areas of the support which bear the thiol compound turn a yellow color within a few seconds after being sprayed with the 2,2'-dithiobis-(5-nitropyridine) reagent compound, and this color persists for more than 24 hours. Using the aforesaid acetone solution, for example, amounts as little as 0.2 micrograms of cysteine, for example, can easily be detected.

The reagent is normally employed in acetone, ethanol or other appropriate organic solvent. Water may be admixed with the solution, if desired, when employing a solvent which is miscible with water. The ability of the present reagent to react with thiols in said organic solvent is a very desirable feature. Additionally, the reagent is essentially specific for thiols. The only interference is produced by strong reducing agents, e.g., sodium acid sulfite, which cause reduction of the disulfide reagent compound. Sodium thiosulfate gives a rapidly fading yellow spot. Other reducing agents, such as ascorbic acid or ferrous sulfate do not interfere. Other reagents used for the detection of thiols are sodium nitroprusside and 5,5'-dithiobis-(2-nitrobenzoic acid). The former compound is not specific for thiols inasmuch as it gives colors with other classes of compounds such as alkyl sulfides and methyl ketones, among others. The latter, dithionitrobenzoic acid compound, while giving a yellow color with thiols, requires an alkaline pH since the colored species is an anion and it does not appear to be suited for use as a spray reagent in organic media, thus, it has been found that an acetone solution of 5,5'-dithiobis-(2-nitrobenzoic acid) does not give any color when sprayed on cysteine spots.

In carrying out the analytical process of this invention, a solution of 2,2'-dithiobis-(5-nitropyridine) in acetone, ethanol or other solvent is mixed with the sample and the mixture observed to determine whether the yellow coloration indicative of the presence of sulfhydryl groups appears and persists. The application of the reagent chemical can be made to a porous surface such as filter paper or thin-layer chromatographic plate either before or after the solution of the sample compound has been allowed to dry thereon. The reaction can, of course, also be carried out in a test tube or other vessel to determine whether the yellow color develops in the reaction mixture. In another method, adapted to qualitative techniques, strips of paper impregnated with the reagent chemical can be dipped into organic solutions of the sample compound to see whether or not the paper develops the yellow coloration indicative of the presence of a thione compound. In still another method, a solid, insoluble, proteinaceous material is dipped into a solution of the reagent chemical; the thiono product which is thereafter formed as a result of reaction with any sulfhydryl groups present in the protein remains in the solution and imparts a yellow color thereto.

The foregoing method is, as indicated, applicable to thiols such as cysteine, methane thiol, ethane thiol, thiophenol, cysteamine, coenzyme A, reduced lipoic acid, reduced glutathione, mercaptoethanol and the like. The method also finds application with proteins and with animal tissues whether or not given a preliminary homogenization and heat-denaturing step. Materials of this character, due to their relatively small content of sulfhydryl groups, lend themselves to analysis by spectrophotometric or colorimetric methods. Thus, analytical absorption techniques can be employed which are similar to those used for the analysis of other chemicals. In any case, the operator is dealing with reaction product spectra which are compared with those obtained from suitable blanks, including those containing only the thiol sample and only the reagent compound, which are carried through the procedure.

In dealing with thiol compounds which are soluble in acetone, ethanol, or in such solvents admixed with water to form miscible solution, the reaction which takes place with the present reagent compound is found to take place readily, under ambient conditions, with immediate development of a color, ranging from very pale yellow to yellow, depending in large measure on the concentration of the thiol compound present. Extremely accurate quantitative determinations can then be made of the thiol content of such solutions by the application thereto of conventional analytical techniques using spectrophotometric or colorimetric devices. As may be seen from the curves presented in the figure of the accompanying drawing, the absorption spectrum of the reagent compound 2,2'-dithiobis-(5-nitropyridine), shown in solid line, is well differentiated from that, shown in dotted line, of its product compound 3-nitro-6-thionopyridine, the peaks of the latter being well displaced from those of the parent compound. These measurements of the respective spectra were made in a solvent containing nine parts of ethanol to one part of Krebs Ringer phosphate buffer, pH 7.4. The parent compound displays a maximum at a wavelength of 314 millimicrons, while the thiono compound displays a maximum at a wavelength 386 millimicrons and a minimum at 284 millimicrons. The $\epsilon$ (molar) extinction value at the parent compound maximum is $2.18 \times 10^4$, while the extinction values at the respective maximum and minimum of the thiono product are $1.29 \times 10^4$ and $8.0 \times 10^2$. From a useful wavelength (m$\mu$) standpoint, it is to be noted that that portion of the spectrum presented by the thiono product compound between about 380 to 480 m$\mu$ is useful in the making of determinations based on color as presented either to the eye or determined by means of the colorimetric device.

PREFERRED EMBODIMENTS OF THE INVENTION

The following examples are illustrative of the invention but are not to be construed as limiting:

Example 1

The sensitivity of 2,2'-dithiobis-(5-nitropyridine) for the detection of L-cysteine is determined by applying to filter paper spots of an aqueous solution containing 0.2 gram of said compound per liter. Each spot represented the application of 1 microliter of the solution, and 0.2 microgram of the L-cysteine. A 0.03 percent solution of 2,2'-dithiobis-(5-nitropyridine) in acetone was then applied to the spots, some of which had been allowed to dry, while others were still wet. All spots turned a yellow color either instantly, or within a few seconds after spraying. In all cases the color persisted for at least 24 hours.

Example 2

Using the same general method as described in Example 1, aqueous solutions of various thiol compounds, as well as others, were applied to filter paper and sprayed with the 0.03 percent acetone solution of 2,2-dithiobis-(5-nitropyridine) reagent. In each case there was applied 1.0 microliter of the solution of the sample compound, the content of each compound present in said volume being indicated in the following table which also shows whether or not a yellow color developed:

COLOR RESPONSES OF VARIOUS COMPOUNDS FOLLOWING APPLICATION OF 2,2'-DITHIOBIS-(5-NITROPYRIDINE) SPRAY [1]

| Compound | Amount used (ug.) | Result [2] |
|---|---|---|
| Glutathione (reduced) | 1 | + |
| Glutathione (oxidized) disodium salt | 1 | − |
| Cysteamine hydrochloride | 1 | + |
| Cystamine hydrochloride | 1 | − |
| 2-thiouracil [3] | 1 | − |
| N-acetyl-DL-homocysteine thiolactone | 1 | − |
| Sodium thiosulfate [4] | 1 | + |
| L-methionine | 1 | − |
| Sodium bisulfite $NaHSO_3$ | 1 | + |
| Ascorbic acid [5] | 10 | − |
| D-glucose | 10 | − |
| L-serine | 10 | − |
| L-histidine hydrochloride | 10 | − |
| Ethylene diamine tetraacetic acid (disodium salt) | 10 | − |
| Triphosphopyridine nucleotide (reduced) tetrasodium salt | 10 | − |
| Ferrous sulfate 7 $H_2O$ | 10 | − |

[1] An acetone solution was sprayed on air-dried spots of the various compounds, as described in Example 1.
[2] + indicates formation of a yellow spot; − indicates absence of color formation.
[3] This compound is in the thione form, thus contains no SH groups.
[4] The color faded rapidly.
[5] No immediate color forms; a faint yellow color is formed after about one hour at room temperature.

The 2,2'-dithiobis-(5-nitropyridine) compound employed in a practice of this invention can be prepared by one or another of a variety of methods which are known to the skilled in the art. In one such method, 2-chloro-5-nitropyridine is dissolved in a methanolic KOH solution which is then saturated with hydrogen sulfide. This solution is refluxed for 2 hours, following which it is diluted with water and acidified with dilute HCl. The precipitate which then forms is filtered off and recrystallized from isopropanol, the orange crystals so recovered having a melting point of 178–180° C. and being the intermediate, 5-nitro-2-pyridinethiol compound. The latter is then dissolved in dilute aqueous KOH, and to this solution is added a solution of iodine in aqueous KI until no more iodine is taken up. The precipitate present in the reaction mixture is filtered off and recrystallized from isopropanol. The crystals so recovered, representing the desired 2,2'-dithiobis-(5-nitropyridine) compound, are pale yellow in color and have a melting point of 154–156° C.

I claim:
1. The method for determining the presence of a thiol compound in a given sample which comprises reacting 2,2'-dithiobis-(5-nitropyridine) with the said sample, the appearance of a yellow color in the resulting product indicating the presence of a thiol compound in the sample.

2. A method as in claim 1 wherein a solution of the sample is applied to a porous surface, and where the area bearing the sample is contacted on said surface with 2,2'-dithiobis-(5-nitropyridine), the presence of a thio compound being manifested by the development of a persistent yellow color in the area of sample application.

3. A method as in claim 2 wherein the solution of the sample is spotted upon filter paper or the porous surface of coated glass by the application of droplets of said solution, and wherein a solution of the 2,2'-dithiobis-(5-nitropyridine) in a solvent is sprayed or otherwise applied to surfaces of the filter paper or coated glass bearing the sample, the resulting appearance of a persistent yellow color in said spots indicating the presence of a thiol compound in the sample.

4. A method as in claim 1 wherein the sample and the 2,2'-dithiobis-(5-nitropyridine) reagent are reacted in a solvent containing said sample and said reagent in solution.

5. A method as in claim 4 wherein the ultraviolet portion of the spectrum of the product mixture solution is employed to determine the content of any thiol present in the sample.

6. A method as in claim 4 wherein the visible portion of the spectrum of the product mixture is employed to determine the content of any thiol present in the sample.

References Cited

Bankovskis et al., Chem. Abstr. 54, 2086c (1960).

MORRIS O. WOLK, Primary Examiner

R. M. REESE, Assistant Examiner

U.S. Cl. X.R.

260—294.8